United States Patent
De Mazière

(10) Patent No.: US 9,709,168 B2
(45) Date of Patent: Jul. 18, 2017

(54) POWER DENSITY OF A REVERSIBLE VARIABLE TRANSMISSION—RVT

(71) Applicant: MAZARO NV, Destelbergen (BE)

(72) Inventor: Filip De Mazière, Destelbergen (BE)

(73) Assignee: Mazaro NV, Destelbergen (BE)

( * ) Notice: Subject to any disclaimer, the term of this patent is extended or adjusted under 35 U.S.C. 154(b) by 53 days.

(21) Appl. No.: 14/655,300

(22) PCT Filed: Dec. 26, 2013

(86) PCT No.: PCT/EP2013/078018
§ 371 (c)(1),
(2) Date: Jun. 24, 2015

(87) PCT Pub. No.: WO2014/102300
PCT Pub. Date: Jul. 3, 2014

(65) Prior Publication Data
US 2015/0337956 A1  Nov. 26, 2015

(30) Foreign Application Priority Data

Dec. 27, 2012  (GB) .................................. 1223469.6

(51) Int. Cl.
*F16H 61/664*  (2006.01)
*F16H 15/38*  (2006.01)
(Continued)

(52) U.S. Cl.
CPC ......... *F16H 61/6649* (2013.01); *F16H 15/38* (2013.01); *F16H 15/52* (2013.01); *F16H 61/06* (2013.01); *F16H 2015/386* (2013.01)

(58) Field of Classification Search
CPC ........ F16H 15/38; F16H 15/52; F16H 15/386; F16H 61/06; F16H 61/6649; F16H 2015/386
See application file for complete search history.

(56) References Cited

U.S. PATENT DOCUMENTS 1,517,722 A * 12/1924 Gerdes .................... F16H 15/52
475/192
1,856,383 A * 5/1932 Gerdes .................... F16H 15/36
475/192
(Continued)

FOREIGN PATENT DOCUMENTS

CN       2336137 Y    9/1999
CN       1375646 A   10/2002
(Continued)

OTHER PUBLICATIONS

International Preliminary Report on Patentability dated Jul. 9, 2015 in International Application No. PCT/EP2013/078018.
(Continued)

*Primary Examiner* — Jacob S Scott
*Assistant Examiner* — Tinh Dang
(74) *Attorney, Agent, or Firm* — Knobbe Martens Olson & Bear LLP

(57) ABSTRACT

The invention provides design modifications to increase the power density of a reversible variable transmission system for vehicles such as cars, buses, trucks, off-road vehicles, lift trucks, telescopic boom handlers and the like. The transmission can also be used in systems such as windmills etc. and other industrial applications that require power to be transferred at variable speeds.

9 Claims, 11 Drawing Sheets

(51) Int. Cl.
*F16H 15/52* (2006.01)
*F16H 61/06* (2006.01)

(56) References Cited

U.S. PATENT DOCUMENTS

| | | | | |
|---|---|---|---|---|
| 2,903,897 | A * | 9/1959 | Whalen | F16H 15/38 |
| | | | | 476/30 |
| 3,302,474 | A * | 2/1967 | Edlich | F16H 15/06 |
| | | | | 475/216 |
| 4,296,647 | A | 10/1981 | Kemper | |
| 4,324,441 | A | 4/1982 | Rouverol et al. | |
| 4,495,829 | A | 1/1985 | Kemper | |
| 4,726,244 | A | 2/1988 | de Pencier | |
| 6,312,358 | B1 * | 11/2001 | Goi | F16H 15/38 |
| | | | | 476/11 |
| 6,575,869 | B2 * | 6/2003 | Ervin | F16H 15/38 |
| | | | | 476/40 |
| 7,011,600 | B2 * | 3/2006 | Miller | B62M 9/08 |
| | | | | 476/36 |
| 8,512,190 | B2 * | 8/2013 | De Maziere | F16H 37/086 |
| | | | | 475/114 |
| 2002/0002778 | A1 | 1/2002 | Ikeda et al. | |
| 2011/0118071 | A1 | 5/2011 | De Maziere | |

FOREIGN PATENT DOCUMENTS

| | | |
|---|---|---|
| DE | 19817955 A1 | 10/1999 |
| EP | 0976956 A1 | 2/2000 |
| EP | 1925849 A1 | 5/2008 |
| GB | 215 209 | 5/1924 |
| JP | 01-003228 | 7/1990 |
| JP | 10-169740 | 6/1998 |
| JP | 2005-291340 | 10/2005 |
| JP | 2008-095710 A | 4/2008 |

OTHER PUBLICATIONS

Search Report in GB Application No. 1223469.6 dated May 28, 2013.

* cited by examiner

POWER DENSITY OF A REVERSIBLE VARIABLE TRANSMISSION—RVT

CROSS-REFERENCE TO RELATED APPLICATIONS

This application is the U.S. National Phase under 35 U.S.C. §371 of International Application PCT/EP2013/078018, filed Dec. 26, 2013, which claims priority to GB 1223469.6, filed Dec. 27, 2012. The disclosures of the above-referenced applications are hereby expressly incorporated by reference in their entireties.

FIELD OF THE INVENTION

The invention relates to the field of gearboxes/transmissions. Especially, the invention provides a new type of reversible variable transmission for vehicles such as cars, buses, trucks, off-road vehicles, lift trucks, telescopic boom handlers and the like. Alternatively, the gearbox can be used in systems such as windmills etc. and other industrial applications that require power to be transferred at variable speeds.

BACKGROUND OF THE INVENTION

Patent application PCT/EP2008/057009 describes a reversible variable transmission comprising so-called planetary variators, overcoming the limitations and disadvantages of actual car transmissions, such as manual transmission (MT), automatic transmission (AT), double clutch transmission (DCT), continuously variable transmission (CVT) and hydrostatic drive (HSD).

According to the patent application mentioned above, a combination of one or more planetary variators in different variable transmission layouts may be used. The planetary variators function as subsystems for variable or reversible transmissions, able to vary continuously the transmission ratio, and consisting of a ring wheel, two or more planets mounted around a central shaft and a sun wheel, so that the ring wheel, the central shaft and the sun wheel form an interface with other transmission components. The planets consist of a planet wheel with basically a conical rolling surface, preferably hardened or coated to transmit tractional and compressive forces, mounted freely rotational around a planet fork by means of radial and axial bearings or bushings and that the virtual top of the mentioned cone coincides with the intersection of the axis of the central shaft with the axis of the hinge of the planet. Each planet fork of a planetary variator can rotate freely around a hinge joint of which the axis is perpendicular on the central shaft axis and parallel to the planet wheel plane and that each planet fork and each planet wheel is designed not to interfere with each other for all applicable inclination angles between the planet axis and the central shaft axis. The ring wheel, planets and sun wheel are squeezed against each other so that the rolling surfaces are in contact with each other and that the contact pressures are high enough to transmit the required torque. The central shaft is moved axially with a defined speed in relation to the squeezing force and transmitted torque, in order to change the transmission ratio and the shape of the rolling surfaces of the planet wheels, which is basically conical, deviates slightly from this theoretical shape in a convex way in order to optimize the contact pressure distribution.

Considering reversible variable transmission of patent application PCT/EP2008/057009, comprising a primary and a secondary planetary variator, the ring wheel of the primary planetary variator is connected to the housing so that it cannot rotate but can move axially by a preload force compressing rolling contacts of both planetary variators. The central shafts of both planetary variators are combined into one main shaft and rotationally connected to the transmission input shaft and axially movable by a steering force in both senses, while the input shaft does not move axially. The sun wheel of the primary planetary variator is connected to the ring wheel of the secondary planetary variator so that the combined sun-ring wheel can rotate around the central axis of the transmission. The sun wheel of the secondary planetary variator is connected to the output shaft of the transmission and that the reaction force of the preload force is transferred to the housing over an axial bearing.

The relative dimensions of the ring wheel, sun wheel and planets are preferably chosen appropriate for a car application, meaning that the highest speed ratio is so high that the engine can deliver its power nearly always at its best efficiency point, but also meaning that the highest speed ratio in reverse is high enough to drive the car with moderate engine speed and low noise in reverse. By moving the main shaft of the transmission, the transmission ratio varies continuously between the highest speed ratio in forward over standstill to the highest transmission ratio in reverse.

The normal force on each rolling contact is created by one preload force, acting from the housing on the not rotating primary ring wheel and the reaction force is transferred over one bearing from the secondary sun wheel to the housing. The net steering forces for defining the position of the main shaft and thus also for defining the transmission ratio, are created by one force in one of both senses and acting from the input shaft to the main shaft, both rotating with the same speed, and that the reaction force is transferred over bearings from the input shaft to the housing.

The preload force as explained above is created by one or more piston and cylinder system(s) between housing and primary ring wheel and activated by a single pneumatic or hydraulic pressure or created by a mechanical preload system, where this mechanical system can also be used as parking brake when the transmission is put in zero speed ratio. The steering pressure is created by a hydraulic or pneumatic piston cylinder system, able to work in both senses, integrated in the input shaft and main shaft. The hydraulic or pneumatic pressure to create the steering pressure is sealed between the stationary housing and the rotating input shaft by piston rings or seals designed to seal parts rotating at different rotational speeds.

The reversible variable transmission of patent application PCT/EP2008/057009 as referred to above, also provides a hydraulic system and application software program, intended to control reversible variable transmission with a hydraulic valve in a car, truck or other on-highway or off-highway vehicle.

The transmission interior, where the rolling contacts are moving, is filled with an inert gas, or normal air and a splashing fluid for cooling and lubrication, or a gas with a mist of a coolant and said interior is sealed from the lube oil for the bearings and from the exterior of the transmission. Multiple options of lubrication flow for the bearings or bushings inside the planets are given with the reversible variable transmission of patent application PCT/EP2008/057009.

The reversible variable transmission provides the user to transmit power at variable speeds in a car, truck, bus, off-road vehicle, mowing machine, wind turbine, telescopic boom handler, lift truck or any other industrial application in which power needs to be transmitted at variable speeds.

The configuration of the reversible variable transmission system contains however further improvement potential in terms of power density: with the same outer dimensions more power can be transmitted. Within the same transmission size and with the same traction coefficient, more power is transferred by applying higher normal forces on the traction wheels and by using the transmission closer to the traction limit. The underlying invention discloses several design modifications resulting in a higher power density.

SUMMARY OF THE INVENTION

The invention provides an improvement of the reversible variable transmission (RVT) comprising planetary variators as defined below. The RVT according to the present invention has a higher power density, within the same dimensions of the RVT as e.g. disclosed in patent application PCT/EP2008/057009. While the initial RVT as described in patent application PCT/EP2008/057009 had a design limit of sustaining squeezing pressures of up to about 10 bar, the present invention provides for an RVT capable of sustaining higher squeezing pressures, typically within a range of 20 to 150 bar.

Typically, the planetary variator, functioning as a subsystem for a variable or reversible transmission, comprises a ring wheel, two or more planets mounted around a central shaft, and a sun wheel, such that ring wheel, central shaft and sun wheel form an interface with other transmission components. Typically, each of the planets comprises a planet wheel running on the running surface of said sun or ring wheel, and a planet fork connecting the planet to said central shaft.

More specifically, the planetary variator, functioning as subsystem for variable or reversible transmissions, able to vary continuously the transmission ratio, is characterized by
- that it consists of a ring wheel, two or more planets mounted around a central shaft and a sun wheel, so that each component, namely the ring wheel, the central shaft and the sun wheel form an interface with other transmission components;
- that the ring wheel is an axisymmetric body around the central axis with a rolling surface shaped according the tractrix curve, and that this surface is preferably hardened or coated to withstand tractional and compressive forces;
- that the sun wheel is principally the same as the ring wheel but the inner and outer diameter of the tractrix curve may differ from the diameters of the ring wheel;
- that the planets consist of a planet wheel with basically a conical rolling surface, preferably hardened or coated to transmit tractional and compressive forces, mounted freely rotational around a planet fork by means of radial and axial bearings or bushings and that the virtual top of the mentioned cone coincides with the intersection of the axis of the central shaft with the axis of the hinge of the planet;
- that each planet fork of one planetary variator can rotate freely around a hinge joint of which the axis is perpendicular on the central shaft axis and parallel to the planet wheel plane and that each planet fork and each planet wheel is designed not to interfere with each other for all applicable inclination angles between the planet axis and the central shaft axis;
- that the ring wheel, planets and sun wheel are squeezed against each other so that the rolling surfaces are in contact with each other and that the contact pressures are high enough to transmit the required torque;
- that the central shaft is moved axially (longitudinally) with a defined speed in relation to the squeezing force and transmitted torque, in order to change the transmission ratio;
- that the tractrix curve of ring and sun wheel have both the same length parameter L as the length from the rolling contact point of the planet wheel to the intersection of the hinge axis with the central shaft axis, where L is used in the tractrix equation;
- $+/-x+c=L*(\cos \alpha+\ln|\tan(\alpha/2)|)$, with c an arbitrary constant and $\alpha$ the inclination angle between the tangent in the contact point and the axis of the central shaft;
- and that the shape of the rolling surfaces of the planet wheels, which is basically conical, deviates slightly from this theoretical shape in a convex way in order to optimize the contact pressure distribution.

Typically, the reversible variable transmission (RVT) comprises a primary and a secondary planetary variator comprising a ring wheel, two or more planets mounted around a central shaft, and a sun wheel, such that ring wheel, central shaft and sun wheel form an interface with other transmission components. Typically, each of the planets comprises a planet wheel running on the running surface of said sun or ring wheel, and a planet fork connecting the planet to said central shaft.

More specifically, the reversible variable transmission (RVT) comprises a primary and a secondary planetary variator, characterized in that:
- the ring wheel of the primary planetary variator is connected to the housing so that it cannot rotate but can move axially by a preload force compressing all rolling contacts of both planetary variators;
- the central shafts of both planetary variators are combined into 1 main shaft and rotationally connected to the transmission input shaft and axially movable by a steering force in both senses, while the input shaft does not move axially;
- the sun wheel of the primary planetary variator is connected to the ring wheel of the secondary planetary variator so that the combined sun-ring wheel can rotate around the central axis of the transmission;
- and in that the sun wheel of the secondary planetary variator is connected to the output shaft of the transmission and that the reaction force of the preload force is transferred to the housing over an axial bearing.

The power density of the transmission concept as described in patent application PCT/EP2008/057009 has now been improved by applying a higher normal force on the traction wheels and by adding a control method enabling to use the transmission closer to its traction limit In order to apply a higher normal force, adaptations or improvements of the original design had to be made. All comparisons and improvements given below with respect to the transmission system need to be considered in relation to the patent application PCT/EP2008/057009 containing the references and original data with what it is compared to.

The improvements are related to the following components of the reversible variable transmission:
- the steering piston;
- the planets: especially with respect to planet wheel, planet cover, planet bearing, legs of the planet fork;
- the control strategy of the squeezing pressure;
- the output shaft.

First, a higher normal force leads to a higher pressure on the steering piston in the steering cylinder. The steering cylinder of the RVT which was rotating at input speed is now integrated in the stationary housing so that piston rings are eliminated from the design. Piston rings were limiting the pressure in the steering cylinder. In addition, elimination of the piston rings is leading to fewer components, having an enhanced effect on cost and complexity, as well as reducing the inertia of the input shaft.

Secondly, when the variator of the transmission has to work more closely to its traction limit, the planet wheels connected to the same point on the main shaft have to describe exactly the same ratio. Therefore the planets now can be tuned using a screwing system integrated within the planet fork, in order to ensure the correct axial distance from the planet wheel running surface to the hinge axis and hence eliminate power losses and unbalance, possibly causing vibrations.

Furthermore, the planet wheels used in the planetary variators or RVT have to withstand the higher normal forces, so they have been redesigned and comprise now a double mantle structure, via which stresses and deformations are reduced, leading to a thinner and lighter construction, decreasing the inertia simultaneously. Additionally, the double mantle having a triangular cross section, provides sufficient stiffness to the transverse forces.

For the same reason the planet wheel used in the planetary variator or RVT has been redesigned further so that it comprises a planet hub and a planet cover, principally shaped as a flat disc. The outer diameter of the planet cover is conical and fits inside the planet hub with the same conical angle. All clearances are eliminated by screwing the planet cover inside the planet hub. This way, a bias contact stress on the conical surface is applied in order to avoid deformation of the planet hub and of the planet wheel. The disc of the planet cover is located inside the planet hub close to the position where the upper planet mantle is supported by the planet hub. This is exemplified in a non-limiting manner in FIG. 2.

The higher normal forces increase the forces applied on the planet bearings. The bearing configuration of the planet wheels has been improved by using a tapered or an axial spherical roller bearing, combined with only one radial bearing reducing the bearing power losses and leading to a more compact and less expensive bearing design.

Finally, regarding the planets used in the planetary variator or RVT, the planet fork as being mainly loaded due to the stresses related to forward driving, and therefore not uniformly loaded, an asymmetric design is more appropriate than having a planet fork with symmetrical legs. In the more compact and more robust redesign of the planet fork the legs are unequal, the leg with highest load being slightly thicker whereas the leg with lowest load is reshaped to a slightly thinner component.

The goal of running the transmission closer to its traction limit is reached by ensuring that the squeezing pressure is not higher than what is needed for torque transfer by friction, increased with a minimal safety margin. This way the efficiency is increased as well because a higher squeezing pressure would only increase the internal transmission losses.

The transmission controller typically calculates the required squeezing pressure based on the actual speed ratio, the speed of ratio variation and the input torque (cf. FIG. 7a). The input torque signal can be obtained from taking the highest from 2 or 3 sources:
The input torque from the engine model
The optional input torque recalculated from measuring the output torque
The input torque calculated from the microslip and the squeezing pressure.

The microslip itself is calculated from comparing 2 signals:
The theoretical no load speed ratio calculated from the measured position of the steering piston
The measured actual speed ratio Alternatively (cf. FIG. 7b), the transmission controller calculates the required squeezing pressure based on the actual input speed, speed ratio, the speed of ratio variation and the input or output torque. The input or output torque signal is obtained from taking the highest from 1 or 2 sources:
The input torque from the engine model or from a model describing the output torque,
Optionally from measuring the output torque
The squeezing pressure can further be adjusted by keeping the microslip at a predefined value by a PID-controller.

The microslip itself is calculated from comparing 2 signals:
The theoretical no load speed ratio calculated from the measured position of the steering piston
The measured actual speed ratio This electronic control method also functions as an electronic protection against macroslip.

Optionally, on top of this electronic slip protection, a mechanical slip protection is integrated in the output shaft design of the RVT by splitting up this shaft into 2 parts: the secondary sun wheel and the output shaft. The secondary sun wheel is centered by the output shaft and is axially supported by the output shaft over tangential ramps. An unforeseen torque peak on the output will induce a pressure peak on the squeezing pressure, i.e. will create an axial force peak of the secondary sun wheel against the planet wheels, thereby stabilizing the microslip.

A final macroslip protection is added by putting both fuel injection of the engine and the squeezing pressure to zero at once, whenever the torque peak exceeds the torque capacity of the transmission.

The invention further provides the following aspects:
Aspect 1. A planetary variator, functioning as a subsystem for a variable or reversible transmission capable of sustaining a squeezing pressure typically within but not limited to the range of 20 to 150 bar, comprising a ring wheel, two or more planets mounted around a central shaft, and a sun wheel, such that ring wheel, central shaft and sun wheel form an interface with other transmission components, wherein each planet comprises a planet wheel running on the running surface of said sun or ring wheel, and a planet fork connecting the planet to said central shaft, characterized in that:
a) a continuous or a discontinuous control system is integrated in the assembly of each of the planets to ensure that the tip of the cone formed by the theoretical, non crowned, planet wheel running surface coincides precisely with the hinge axis of the planet fork when a certain load is applied on the running surface; and/or
b) the planet wheel is made of an upper planet mantle and a lower planet mantle, such that the neutral fiber of the upper planet mantle principally coincides with the vector of the normal forces on the planet wheel running surface, and such that the neutral fiber of the lower planet mantle lies principally in the plane formed by the tangential forces acting on the two contact areas of the running surface; and/or
c) each planet comprises a planet cover and a planet hub, and wherein:
the planet cover and the planet hub are assembled in each other without any clearance or with a preload; and/or the disc of the planet cover is mounted closely to the height where the upper planet mantle is supported by the planet hub; and/or the planet cover comprises at least a principally flat disc between the contact surface with the planet hub; and/or d) the axial and a part of the radial forces acting on each of the planets are taken by one tapered bearing or one axial spherical roller bearing, wherein the inclination angle for an axial spherical roller bearing is defined at the centre of the roller element, wherein the remainder of the radial forces is supported by one radial bearing, and wherein optionally the inclination angle of the normal on the outer ring rolling surface versus the axial load ranges from 20° to 50°; and/or e) the two legs of the planet fork are not identical.

Aspect 2. A reversible variable transmission capable of sustaining a squeezing pressure typically within but not limited to the range of 20 to 150 bar, comprising a primary and a secondary planetary variator according to aspect 1.

Aspect 3. The reversible variable transmission according to aspect 2, further comprising a squeezing piston to press all traction wheels against each other, and a steering piston to control the speed ratio, characterized in that:

a) the steering piston does not rotate together with the main shaft, but moves axially with respect to the housing and it relocates the main shaft axially over an axial bearing, and in that the hydraulic or pneumatic pressure for the steering piston is directly supplied or drained from the housing without any dynamic seals such as piston rings; and/or;

b) a transmission controller calculates the squeezing pressure acting on the squeezing piston based on the input or output torque signal, the input speed, the speed ratio and the speed of ratio variation, where the input torque signal is the highest of the following 1 or 2 input data:
b1) input torque signal from engine model, including the auxiliaries, or from a model describing the output torque
b2) optional torque signal from the output torque sensing device (FIG. 7b); and/or c) the transmission further comprises a mechanical squeezing pressure control and slip protection back-up integrated in the output shaft between the sun wheel and the axial output shaft bearing, said slip protection back-up comprising lubricated tangential ramps in both directions and a centering device to keep the sun wheel shaft centered, wherein the tangent of the angle of the ramps corresponds to the proportionality of the max tangential shaft force over the axial output shaft force.

Aspect 4. The RVT according to aspect 3, wherein in option b) the squeezing pressure is further adjusted by keeping the microslip at a predefined value by a PID-controller and wherein said microslip itself is calculated by comparing the following 2 signals:
b3) the theoretical no load speed ratio obtained from measuring the position of the steering piston, or the no load speed ratio calculated from measuring the squeezing piston position and the knowledge of the requested driving sense, and
b4) the measured actual speed ratio.

Aspect 5. The RVT according to aspects 3 or 4, comprising feature b) and further comprising a final slip protection in case the torque exceeds the transmission torque capacity, by putting immediately the squeezing pressure and the engine torque to zero as long as the overload is applied, and whereby the overload torque is detected when the required squeezing pressure would exceed the design limit.

Aspect 6: A reversible variable transmission comprising a primary and a secondary planetary variator comprising a ring wheel, two or more planets mounted around a central shaft, and a sun wheel, such that ring wheel, central shaft and sun wheel form an interface with other transmission components further comprising:

a squeezing cylinder with squeezing piston to press all traction wheels against each other, and a steering cylinder with steering piston to control the ratio, characterized in that:

a transmission controller that calculates the squeezing pressure based on the input torque signal, the speed ratio and the transmission model, where the input torque signal is the highest of the following 2 or 3 input data:

a) input torque signal from engine model, including the auxiliaries,
b) optional input torque signal from the output torque sensing device, recalculated to input torque considering the transmission ratio and the losses, and
c) input torque signal calculated via the transmission model by the actual speed ratio and its variation, the actual squeezing pressure and the actual slip, calculated by comparing the following 2 signals:
c1) the theoretical no load speed ratio obtained from measuring the position of the steering piston, and
c2) the measured actual speed ratio (FIG. 7a).

Aspect 7: The transmission according to aspect 6, wherein in step c) the no load speed ratio is calculated from measuring the squeezing piston position and the knowledge of the requested driving sense instead of measuring the position of the steering piston.

Aspect 8: The transmission according to aspect 6 or 7, further comprising a mechanical squeezing pressure control and slip protection back-up integrated in the output shaft between the sun wheel and the axial output shaft bearing, said slip protection comprising lubricated tangential ramps in both directions and a centering device to keep the sun wheel shaft centered, wherein the tangent of the angle of the ramps corresponds to the proportionality of the max tangential shaft force over the axial output shaft force.

Aspect 9: The transmission according to any one of aspects 6 to 8, further comprising a final slip protection in case the torque exceeds the transmission torque capacity, realized by putting immediately the squeezing pressure and the engine torque to zero as long as the overload is applied, wherein the overload torque is detected when the required squeezing pressure would exceed the design limit.

Aspect 10: A reversible variable transmission comprising a primary and a secondary planetary variator comprising a ring wheel, two or more planets mounted around a central shaft, and a sun wheel, such that ring wheel, central shaft and sun wheel form an interface with other transmission components, or the RVT according to anyone of aspects 6 to 9, characterised in that the steering piston does not rotate together with the main shaft, but moves axially with respect to the housing and it relocates the main shaft axially over an axial bearing, and in that the hydraulic or pneumatic pressure for the steering piston is directly supplied or drained from the housing without any dynamic seals such as piston rings.

Aspect 11: A Planetary variator, functioning as a subsystem for a variable or reversible transmission, comprising a ring wheel, two or more planets mounted around a central shaft, and a sun wheel, such that ring wheel, central shaft and sun wheel form an interface with other transmission components, characterized in that a continuous or a discontinuous control system is integrated in the assembly of the planet to ensure that the tip of the cone formed by the theoretical, non crowned, planet wheel running surface coincides precisely with the hinge axis of the planet fork when a certain load is applied on the running surface.

Aspect 12: A Planetary variator, functioning as a subsystem for a variable or reversible transmission, comprising a ring wheel, two or more planets mounted around a central shaft, and a sun wheel, such that ring wheel, central shaft and sun wheel form an interface with other transmission components, or the planetary variator according to aspect 11, characterized in that:
the planet wheel is made of an upper planet mantle and a lower planet mantle, such that the neutral fiber of the upper planet mantle principally coincides with the vector of the normal forces on the planet wheel running surface, and such that the neutral fiber of the lower planet mantle lies principally in the plane formed by the tangential forces acting on the 2 contact areas of the running surface.

Aspect 13: A Planetary variator, functioning as a subsystem for a variable or reversible transmission, comprising a ring wheel, two or more planets mounted around a central shaft, and a sun wheel, such that ring wheel, central shaft and sun wheel form an interface with other transmission components, or the planetary variator according to aspects 11 or 12, characterized in that:
the planet cover and the planet hub are assembled in each other without any clearance or with a preload,
the disc of the planet cover is mounted closely to the height where the upper planet mantle is supported by the planet hub, and/or
the planet cover comprises at least a principally flat disc between the contact surface with the planet hub.

Aspect 14: A Planetary variator, functioning as a subsystem for a variable or reversible transmission, comprising a ring wheel, two or more planets mounted around a central shaft, and a sun wheel, such that ring wheel, central shaft and sun wheel form an interface with other transmission components, or the planetary variator according to any one of aspects 6 to 8, characterized in that:
the axial and radial forces acting on the planet are taken predominantly by 1 tapered bearing, whereby optionally the inclination angle of the normal on the outer ring rolling surface versus the axial load ranges from 20° to 50° (cf. FIG. 8) wherein optionally this tapered bearing is assisted by 1 sliding or rolling bearing with significantly lower bearing capacity.

Aspect 15. A Planetary variator, functioning as a subsystem for a variable or reversible transmission, comprising a ring wheel, two or more planets mounted around a central shaft, and a sun wheel, such that ring wheel, central shaft and sun wheel form an interface with other transmission components, or the planetary variator according to any one of aspects 11 to 15, characterized in that the 2 legs of the planet fork are not identical.

Aspect 16. The use of the planetary variator or RVT according to any one of the previous aspects, in passenger cars, trucks, garbage trucks, city buses, off-highway vehicles, mowing machines, lift trucks, telescopic boom handlers, Kinetic Energy Recovery Systems (KERS), wind turbines, or industrial applications where power must be transferred at variable speeds.

Any of the above embodiments can be combined in a single preferred embodiment, encompassing all improvements. The invention thus provides for planetary variators having all improvements of the above mentioned embodiments and for a RVT encompassing all improvements of the above mentioned embodiments of both the RVT and the planetary variators.

BRIEF DESCRIPTION OF THE DRAWINGS

Embodiments of the invention will be described, by way of example only, with reference to the accompanying drawings. Nomenclature of parts in the drawings: (1) input shaft, (2) housing, (3) steering piston, (4) axial bearing, (5) main shaft, (6) planet wheel, (7) upper planet mantle, (8) lower planet mantle, (9) planet hub, (10) planet cover, (11) planet fork, (12) planet shaft, (13) lock screw, (14) tapered bearing, (15) radial bearing, (16) planet wheel running surface, (17) hinge axis of planet fork, (18) upper neutral fiber, (19) lower neutral fiber, (20) caliber, (21) squeezing piston, (22) sun wheel shaft with ramps, (23) output shaft with ramps, (24) tangential ramp, (25) inclination angle of the normal on the rolling surface of the outer ring, (26) radial force, (27) axial force, (28) resultant of radial and axial force, (29) angle of the resultant.

DETAILED DESCRIPTION OF THE PREFERRED EMBODIMENTS

The present invention will be described with respect to particular embodiments and with reference to certain drawings, however the invention is not limited thereto but only by the claims. The drawings described are only schematic for illustrative purposes and are non-limiting.

Figure 9:
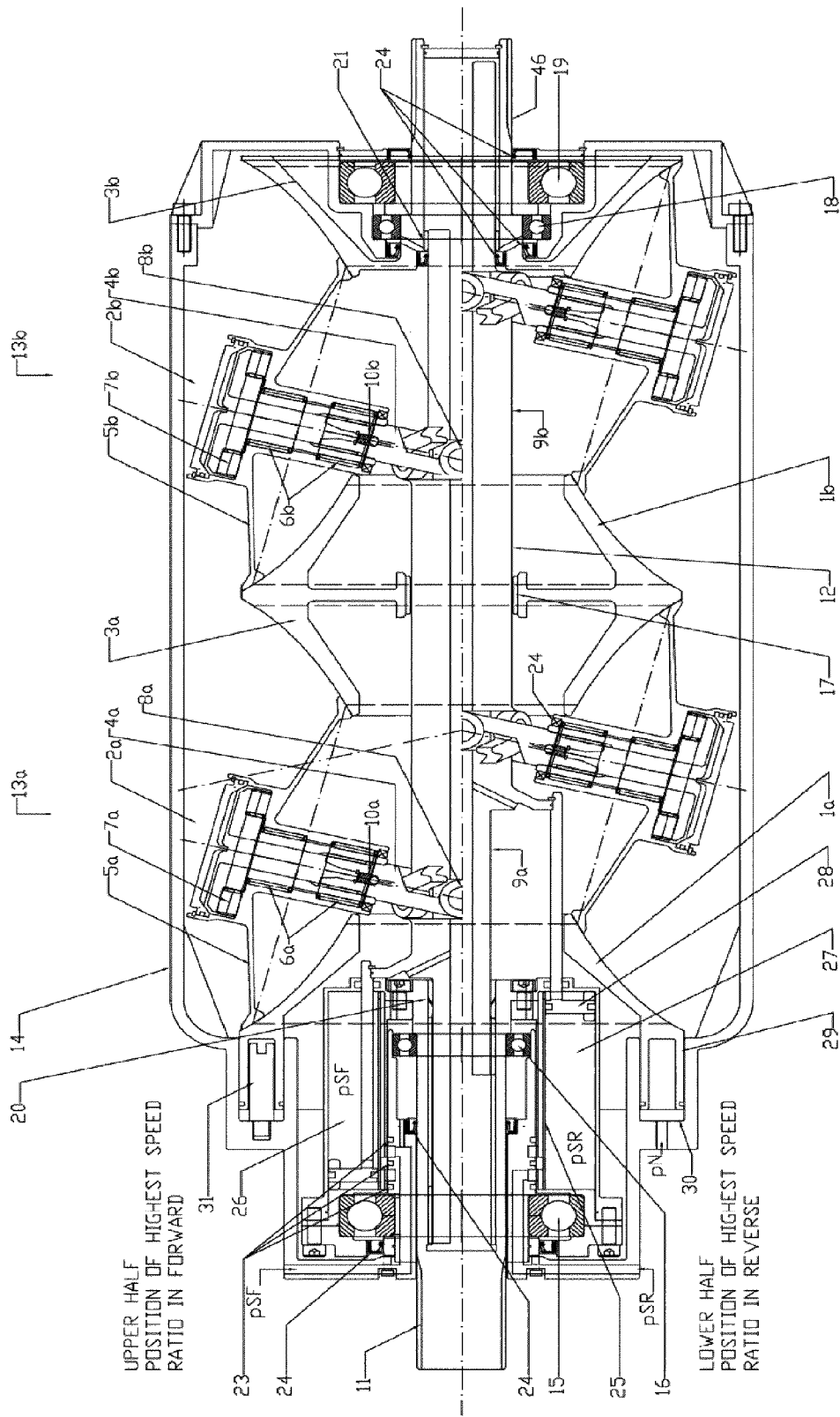
FIG. 9: Schematic representation of the reversible variable transmission of patent application PCT/EP2008/057009. This drawing is integrally taken over from the patent application PCT/EP2008/057009, with the text and numbers as originally depicted in this previous patent application, which is hereby incorporated in its entirety by reference, and with numbers as referred to in the nomenclature list of this previous patent application, which need to be seen limited to this figure only: (1) ring wheel, (2) planet, (3) sun wheel, (4) planet fork, (5) planet wheel, (6) planet radial bearing, (7) planet thrust bearing, (8) hinge pin, (9) central shaft, (10) pressure relief valve, (11) input shaft, (12) main shaft, (13) Planetary Variator, (14) housing, (15) axial bearing at input, (16) radial bearing at input, (17) bushing sun-ring wheel, (18) radial bearing at output, (19) axial bearing at output, (20) input bushing, (21) output bushing, (22) oil distributor, (23) piston rings, (24) lip seals, (25) sealing tube, (26) forward steering cylinder, (27) reverse steering cylinder, (28) steering piston, (29) preload force piston, (30) preload force cylinder, (31) locator pins, (32) oil pumping vanes, (33) pressure reducing valve for forward steering pressure (pSF prop), (34) pressure reducing valve for reverse steering pressure (pSR prop), (35) pressure reducing valve for Normal pressure (pN prop), (36) safety shut off valve for forward steering pressure, (37) safety shut off valve for reverse steering pressure, (38) low pressure accumulator, (39) high pressure accumulator, (40) oil pump, (41) hydraulic pump switch, (42) hydraulic feed switch, (43) hydraulic accumulator switch, (44) pressure sensors, (45) steering force, (46) output shaft, (47) torque transferring device (i.e. spline connection), (48) ring gear, (49) planetary gear, (50) planetary gear carrier, (51) sun gear, (52) preload force, (53) steering force, Index a: primary Planetary Variator, Index b: secondary Planetary Variator.

The present invention will be described as modifications to the reversible variable transmission system as shown schematically in FIG. 9 and described above. Corresponding parts are mentioned below with the addition of further novel and inventive features.

Modifications to the Reversible Variable Transmission

1. Squeezing Pressure Control and Slip Protection

Electronic Squeezing Pressure Control Strategy

Figure 6:
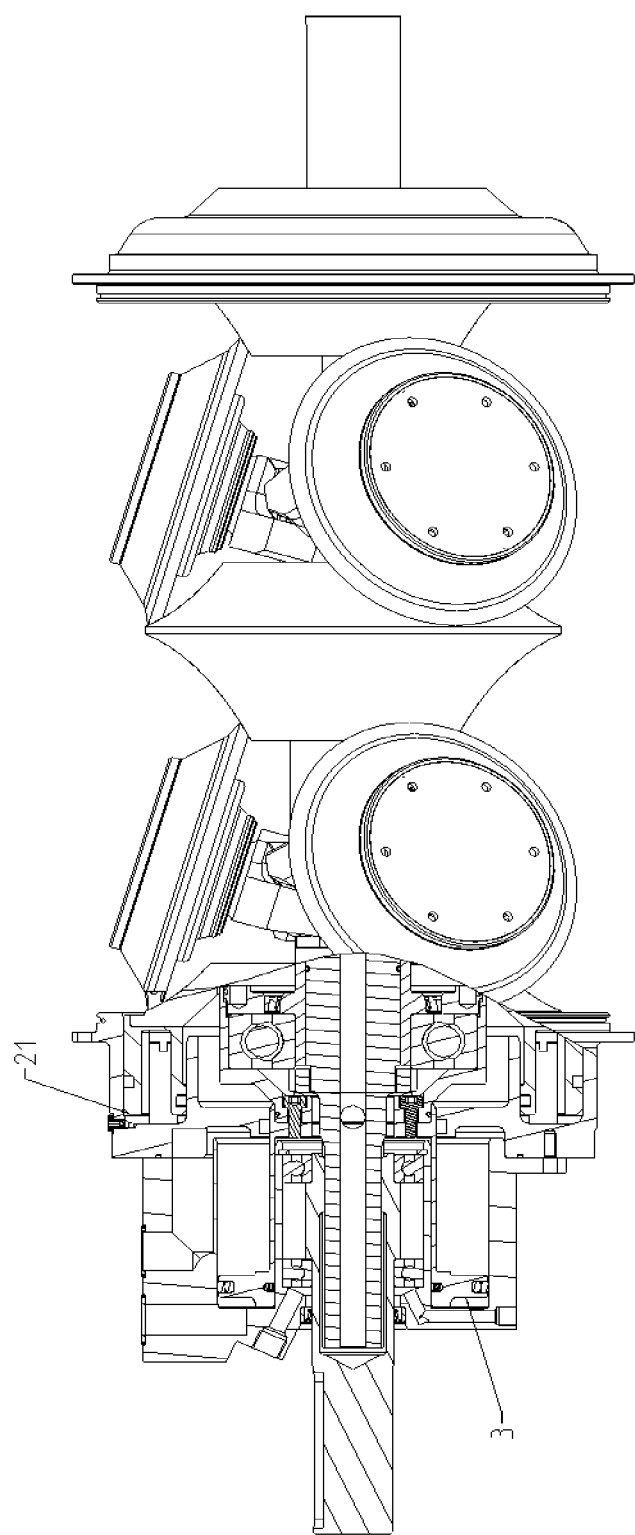
FIG. 6: Schematic representation of the reversible variable transmission of the invention.

FIG. 6 illustrates the squeezing piston (21) onto which squeezing pressure is acting in order to press all traction wheels against each other ensuring the torque transfer by friction. Applying a squeezing pressure much higher than needed would merely increase the internal transmission losses. It is thus important that the transmission controller knows the torque level so that it can calculate the needed squeezing pressure by means of the transmission model.

In most driving circumstances the squeezing pressure can be calculated from the throttle position and the transmission ratio. For each throttle position the ideal engine speed and the corresponding engine torque are stored in the memory of the transmission controller, the ideal engine speed and the corresponding engine torque also depending upon engine temperature, ambient air conditions and dynamic effects of the engine. With a given input torque and the requested transmission ratio and the variation of these values due to the acceleration, the normal force at all rolling contacts can be calculated. Once these data are known, the needed squeezing pressure is calculated.

At very low speed ratios (speed ratio is the transmission output speed divided by its input speed) this method becomes inaccurate. Suppose a car is queuing with a speed ratio of 0.01. The transmission output torque is of the magnitude 15 Nm. The input torque is thus 100 times smaller or 0.15 Nm above the torque needed to overcome the losses and to drive the auxiliaries. Suppose the car starts driving steeply uphill and the transmission output increases up to 75 Nm. The input torque increases by only 0.6 Nm. This small torque level increase will not be noticed among the varying torque levels of the auxiliaries, and the transmission controller will not be able to calculate the optimal squeezing pressure.

The feed-forward method mentioned above can be improved by measuring also the output torque by a torque sensing device. Once this sensing device is installed, it is not only useful at low speed ratios but it will also provide more accurate torque information at any speed ratio. Fast torque fluctuations due to a rough road will be measured too. The input torque is then calculated by the known speed ratio and by adding the transmission losses known from the transmission model.

A torque spike at the output, i.e. caused by an obstacle on the road, may induce slip in the transmission before the engine speed is remarkably reduced and thus before the transmission controller knows that the torque increases. Without an output torque sensing device, the deviation of engine speed below the wish speed is the only way to detect a torque increase. In this case the engine speed will reduce together with the whole vehicle as a result of the torque spike. Reaction on the torque spike action appears only later, i.e. there is no early detection feedback signaling.

To avoid a rather late post factum determination as described above, a feedback input torque signal is also presented to the transmission controller, on top of the feed-forward input torque signal from the engine model as described above.

A position sensor measures the position of the steering piston. From the transmission model the theoretical no load speed ratio can be calculated for each position of the steering piston. The real slip is calculated from the measured speed ratio and the theoretical no load speed ratio. A PID controller will adjust the calculated feed forward squeezing pressure to keep the microslip at its optimal predefined value (FIG. 7*b*).

To summarize there are 2 or 3 signals available for squeezing pressure control:

Input torque from the engine model for feed-forward

Optional input torque from the output torque measuring device for feed-forward

The measured slip for feed-back

The highest value of the 2 input torque signals is used as input for the model to define the squeezing pressure.

Equivalent to using input torque signals, the transmission model can use as well output torque signals. Via the transmission ratio and the model of the internal transmission losses the output torque can be calculated from the input torque.

Figure 7A:
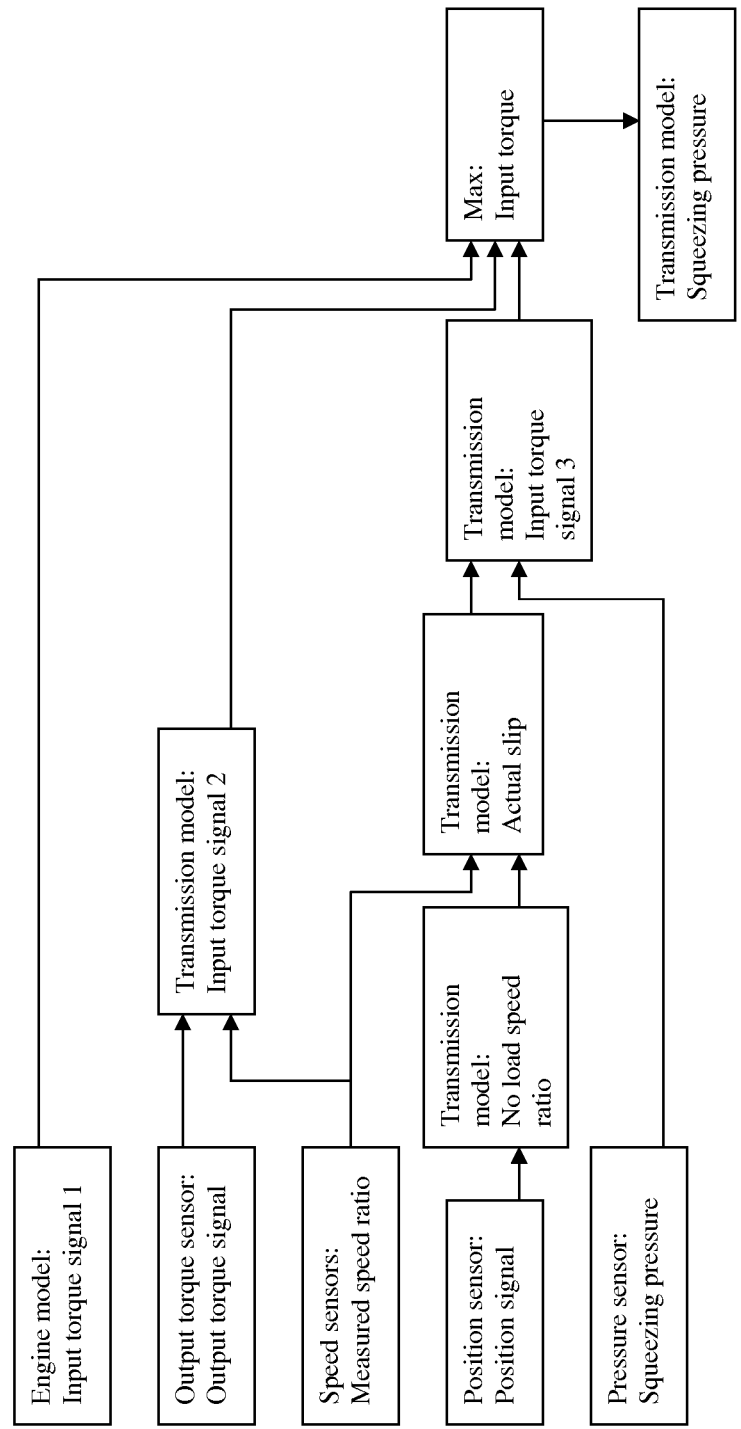
FIG. 7: Schematic representations of the electronic slip protection feedback loop control systems.
Figure 7B:
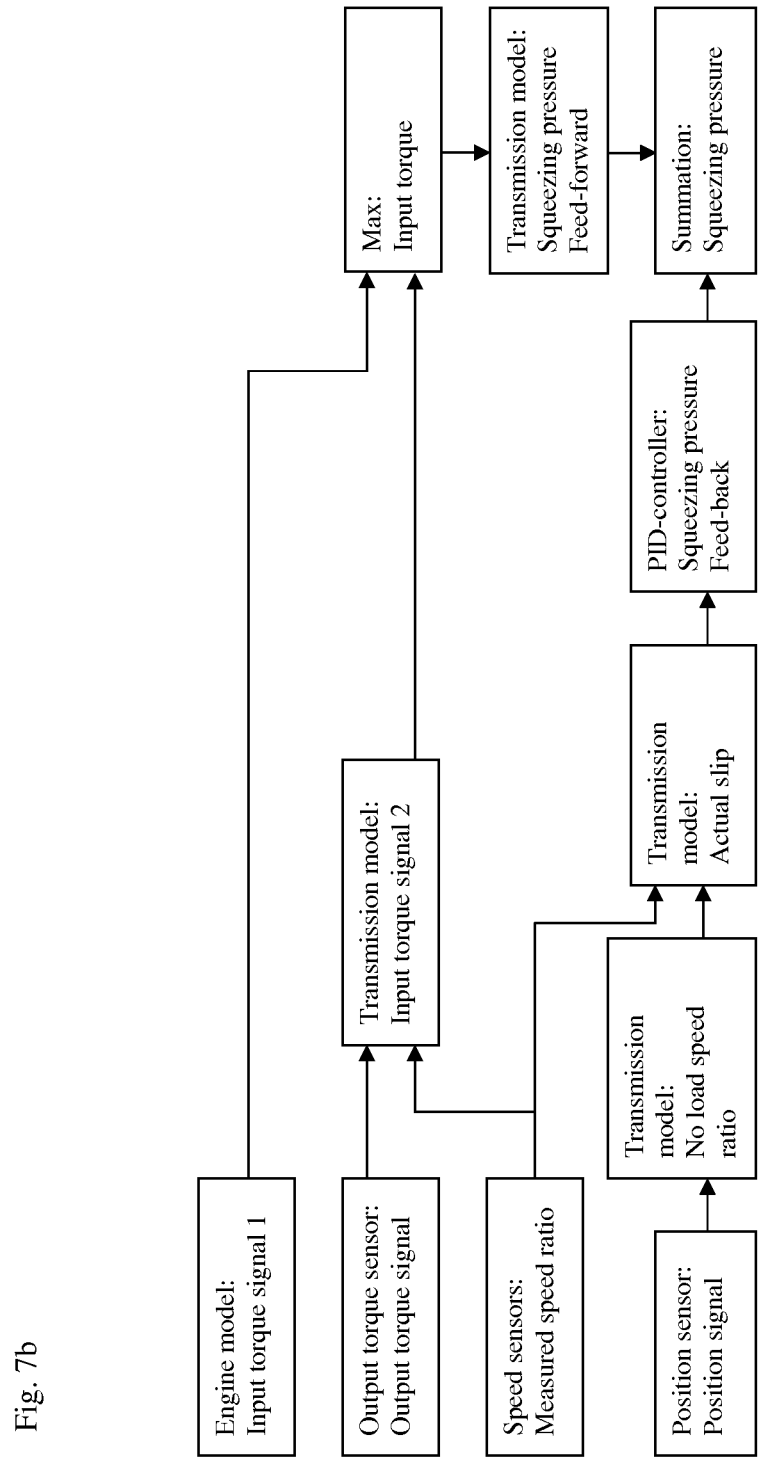

The embodiment of the present invention is illustrated in FIG. 7. Whenever a torque spike appears on the output, the transmission microslip increases sharply, while the measured microslip will lead to a fast increase in squeezing pressure which will redirect the microslip to its optimal value.

The steering piston travel is relatively long so that it can be hard to find an adequate position sensor on the market. Alternatively the position sensor can be mounted on the squeezing sensor because its travel is much shorter. When the driving direction is known—from the driver's request—there is a geometrical relation between the position of the squeezing piston (21) and the theoretical no load speed ratio.

Mechanical Squeezing Pressure Control and Slip Protection

As backup for the electronic squeezing pressure control as described above, a further mechanical squeezing pressure control with slip protection may be added.

Figure 5:
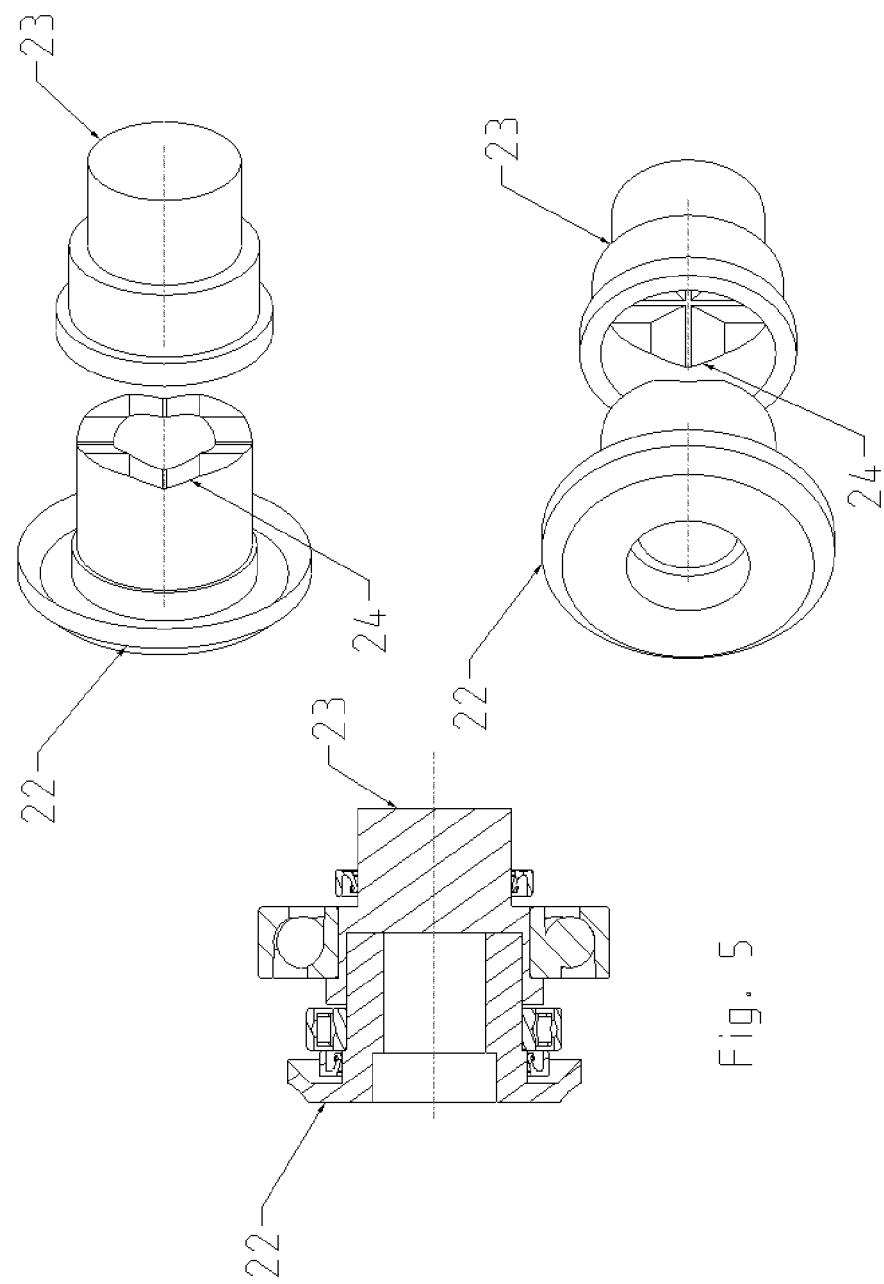
FIG. 5: Schematic representation of the mechanical slip protection.

The transmission output shaft between the secondary sun wheel and the axial bearing is loaded due to an axial force, caused by the squeezing pressure, and is loaded due to torsion from the transmitted torque. At a certain diameter of the shaft, the maximal tangential force from the torque is proportional to the axial force. When the torque would exceed this proportionality, the transmission would slip. In embodiments of the present invention, this exceeding proportionality feature related to torque is integrated, providing a mechanical slip protection system by splitting up the output shaft into sun wheel shaft (22) and output shaft (23), such that both shafts fit in each other over tangential ramps (24), as illustrated in FIG. 5. The ramps (24) are located in the transmission area, being lubricated by the bearing oil. The mechanical slip protection mechanism is meant as a safety mechanism, and therefore not intended for frequent use. As a result, balls or rollers between the ramps acting as a bearing are not required. The tangent of the angle of the ramps corresponds to the relation between tangential force and the axial force. The ramps (24) are made in both directions so that the slip protection works both in forward as in reverse.

For manufacturing reasons, it will be more convenient to make a separate ring, comprising the ramps (24) and then mount this ring inside the output shaft (23). There are many conventional ways to avoid that the ring with ramps (24) rotates inside the output shaft (23), of which a few examples can be given. Possible options can be e.g. mounting the ring with bolts, or placing cams on the outer diameter of the ring, fitting in slots in the output shaft (23), or using a spline connection.

When the squeezing pressure is too low for the applied torque in embodiments of the present invention with reference to FIG. 5, the ramps (24) will start sliding over each other and they will push the secondary sun wheel shaft (22) in the direction of the squeezing piston (21). Hydraulic oil will be pressed out of the squeezing cylinder through the controlling solenoid. In the ports of this solenoid flow forces will occur so that the pressure inside the squeezing cylinder increases even before the electronic control system can react. The increased squeezing pressure will counteract the initiating slip and avoid further disengagement of the mechanical slip protection system. Once the controller measures the unrequested increasing squeezing pressure, together with the unrequested transmission ratio changes, it is known that the mechanical slip protection system is activated and the squeezing pressure will be controlled to avoid macroslip.

Coasting Vehicle Slip Protection

As a final protection provided in embodiments of the present invention, both the fuel injection of the engine and the squeezing pressure are put to zero at once, whenever the torque peak exceeds the torque capacity of the transmission. The vehicle will coast for the very short time that this protection is active. The overload condition is detected when the required squeezing pressure exceeds the design limit.

Embodiments of the present invention comprising slip protection systems described above will not only protect the transmission against damage but their primary task is to ensure driving with a squeezing pressure level with a lower safety margin.

2. Steering Piston

Figure 1:
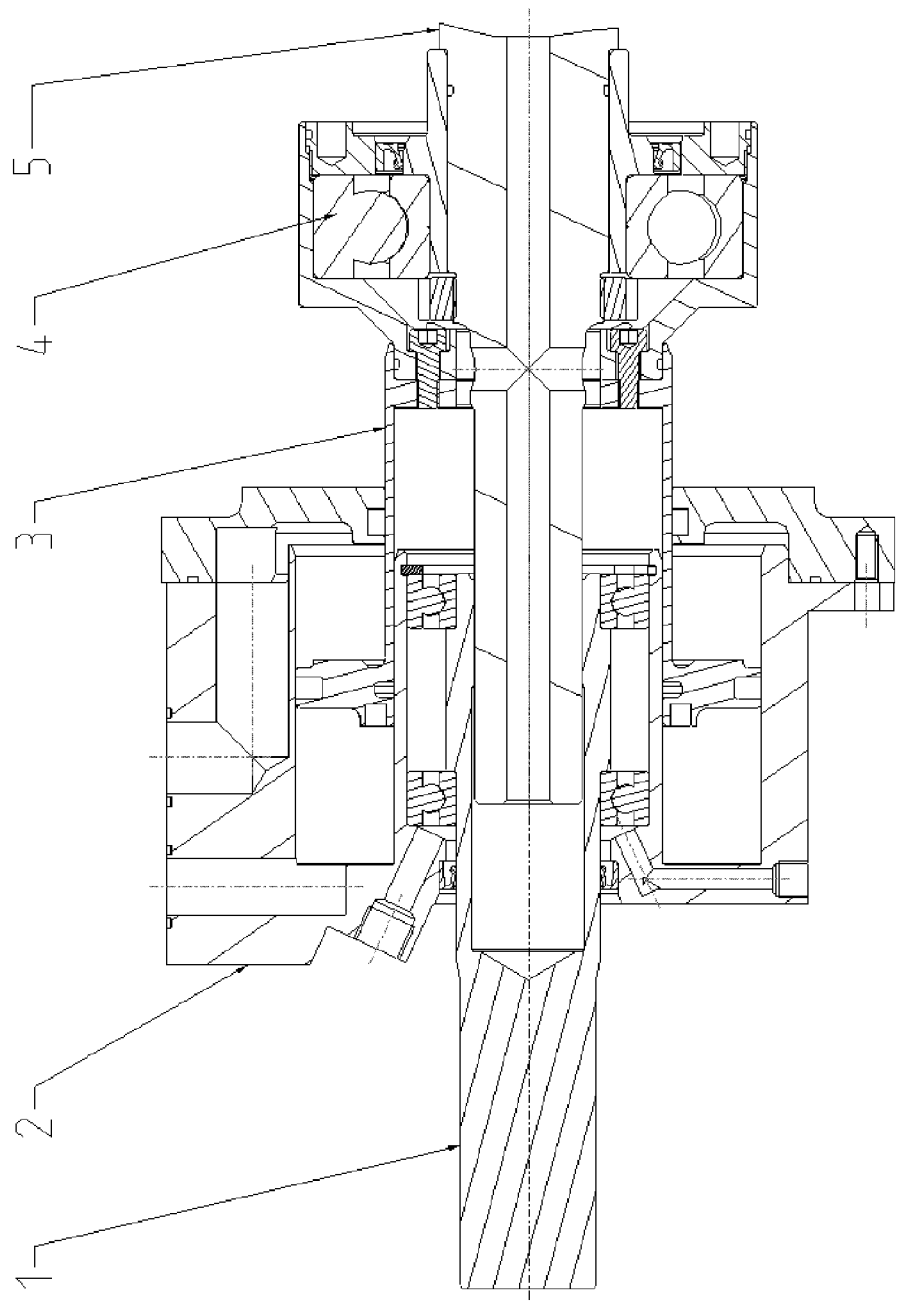
FIG. 1: Schematic representation of the steering piston.

With reference to embodiments of the invention, the integration of the steering cylinder system into the transmission housing will be described with reference to FIG. 1 and FIG. 6.

The main shaft (5) shifts axially by an axial bearing (4) or in particular by a 4-point angular contact ball bearing. This axial bearing (4) is steered by the stationary double acting steering piston (3). The hydraulic pressure has a direct connection with the hydraulic control block. Hydraulic channels are short and wide, allowing high flows with a very low pressure drop to accomplish fast ratio changes. The axial bearing (4) is submitted to the same forces and speeds as in the design of the patent application PCT/EP2008/057009 and hence it is not loaded more.

Compared to the design as described in the patent application PCT/EP2008/057009, the hydraulic pressure in the present invention no longer has to be transferred from the stationary housing to the rotating piston. The piston rings in embodiments of the present invention are therefore eliminated, and hence oil leakage is almost fully eliminated. The transmission can run for a long time in the same ratio while the pressure for the hydraulic control bloc is supplied from an accumulator without a pump consuming power.

Embodiments of the present invention comprise fewer components related to the steering piston system, thereby reducing cost and complexity of the assembly. Furthermore, the inertia of the input shaft (1) has decreased significantly compared to the patent application PCT/EP2008/057009.

3. Tuning the Planets

Embodiments of the present invention provide a construction with a continuous tuning mechanism of the axial distance from the planet wheel running surface (16) to the hinge axis (17) of the planet fork (11). This tuning mechanism compensates on dimensional differences amongst the planets caused by the existing and inevitable production tolerances in the components of the planets. With the tuning mechanism, all planets define the same geometrical dimensions of the rolling body, which is needed to preserve the system from unwanted generated difference in transmission ratio, reduced torque capacity, less efficiency and unbalance, possibly causing vibrations.

Figure 2:
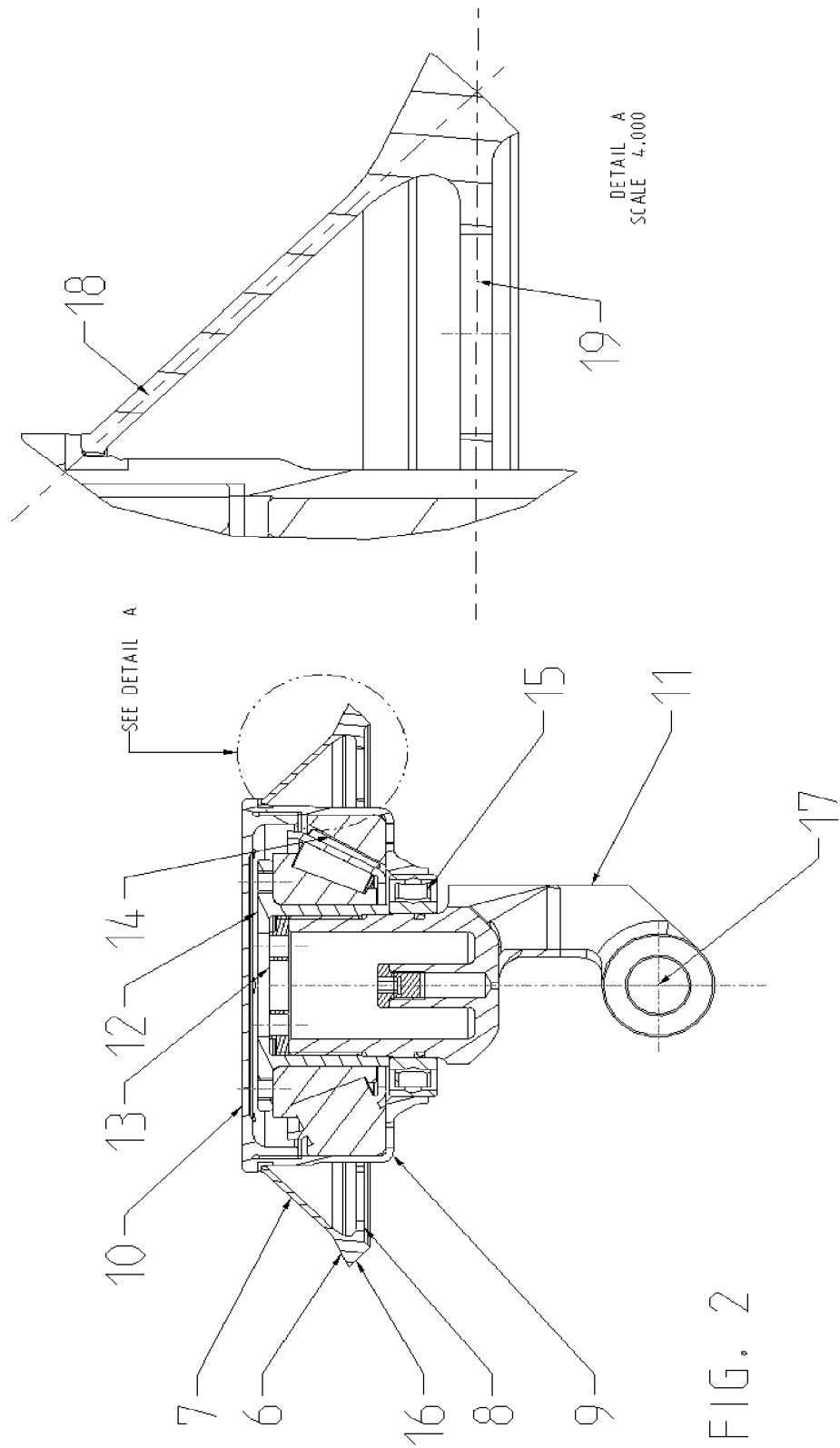
FIG. 2: Schematic representation of the planet tuning system, the shape of the planets, planet cover and planet wheel bearings.
Figure 4:
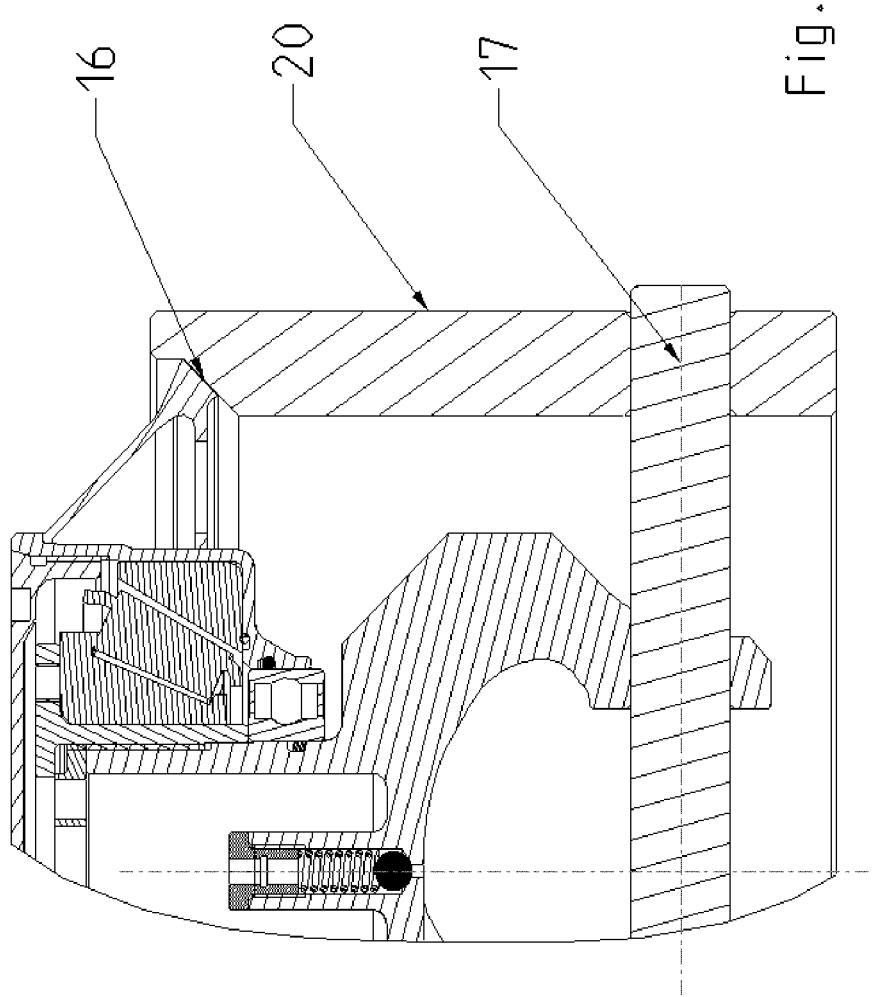
FIG. 4: Schematic representation of the tuning of the planet with a caliber.

A practical implementation is shown in FIG. 2 and FIG. 4. The planet shaft (12) with bearings, planet hub (9) and planet wheel (6) is screwed over the planet fork (11) up to the mechanical endstop of a caliber (20) providing the exact distance of the hinge axis (17) to the planet wheel running surface (16). The tuning position can be fixed, whereby this fixation is secured by tightening the lock screw (13) against the planet fork (11). The tuning ensures that the tip of the theoretical cone from the conical planet wheel running surface (16) coincides with the hinge axis (17) of the planet fork (11) under a given load.

4. Shape of the Planet Wheels

In embodiments of the present invention the planet wheels are designed such that they resist high normal forces generated in the contact area with ring wheel and sun wheel, in order to transmit traction and independent from the transmitted tangential forces resulting from traction in said contact area. The value of the normal forces depends on the size of the transmission and on the transmitted torque, but for the shown example they can reach e.g. about 30 kN. The relationship of the traction forces over the normal forces is limited by the friction coefficient of the system. The larger the normal forces, the more torque can be transmitted.

As described with respect to FIG. 2, embodiments of the present invention have a planet wheel (6) comprising a double mantle, i.e. the upper planet mantle (7) and the lower planet mantle (8). The upper planet mantle (7) is loaded by compressive stresses only—and not by bending stresses—resulting from the normal forces, while the lower planet mantle (8) is loaded only by compressive and tensile stresses resulting from the tangential forces. As a result, with the planet wheel double mantle, stresses and deformations are reduced, leading to a thinner and lighter construction compared to the planet wheel of patent application PCT/EP2008/057009 as depicted in FIG. 9. Due to this mass reduction, the inertia has decreased simultaneously.

Embodiments of the present invention comprising a planet wheel with double mantle provide the elimination of the bending stresses in the planet wheel. With reference to FIG. 2 detail A, the vectors of the normal forces coincide with the upper neutral fiber (18) of the upper planet mantle (7), while the vectors of the tangential forces lie in the same plane as the lower neutral fiber (19) of the lower planet mantle (8).

As shown in FIG. 2 detail A, the upper planet mantle (7) and the lower planet mantle (8) form a triangular cross section, providing sufficient stiffness to the transverse forces, tangent to the contact area and in the plane of the cross section shown in FIG. 2, becoming significant at fast ratio changes. As an example, during acceleration of the car, the speed ratio varies e.g. at speeds below 0.5 Hz, the transverse forces remain negligible (10 to 500 N in comparison to the normal force of about 20 kN), but during a kick-down the transverse forces may increase to around 1000 N and the speed ratio hence could change with a speed up to 5 Hz.

Design optimization by means of numerical strength calculations, taking into account e.g. the centrifugal forces and gyroscopic moments, may lead to a small dislocation of the upper neutral fiber (18) and the lower neutral fiber (19) with respect to the described principle by repositioning the upper or lower planet mantle relative to the contact area.

5. Planet Cover

As illustrated in FIG. 2, embodiments of the present invention provide the planets with a planet cover (10) mounted into the planet hub (9) without clearance in order to avoid deformation of the planet hub (9) and of the planet wheel (6). Without the planet cover (10) the circular egde of the planet hub (9) would deform to an elliptical shape, due to the normal forces transmitted by the upper planet mantle (7) to the upper rim of the planet hub (9).

The planet cover (10) is principally designed as a flat disc with conical edge. The radial forces acting on the side of the planet cover (10) do not generate any bending stresses resulting in minimal deformation. The plane of the planet cover (10) is mounted closely to the support plane of the upper planet mantle (7) within the planet hub (9).

FIG. 2 illustrates with respect to embodiments of the present invention, how the planet cover (10) can be mounted without clearance inside the planet hub (9). The outer edge sidewall of the planet cover (10) is conical and fits inside the planet hub (9) with the same conical angle. All clearances and potential relative movements are eliminated as the planet cover (10) is screwed inside the planet hub (9). Hence, a bias contact stress on the conical surface is applied. An alternative method to mount the planet cover (10) without clearance is e.g. the well-known press fit, as known from mounting gears on shafts for instance.

The final shape of the planet cover (10) may deviate slightly from the flat disc design in order to compensate for additional stresses resulting from centrifugal forces.

As the planet cover (10) is merely loaded by compressive forces, a light material, such as Aluminum, for the construction of the planet cover (10) can be chosen while the required stiffness is still maintained.

6. Planet Wheel Bearings

High axial forces act on the bearings of the planets. Furthermore, these bearings are also loaded due to radial forces. As described in the patent application PCT/EP2008/057009, the radial bearings, also shown in FIG. 9, are subject to the radial loads. A simpler and more efficient bearing arrangement can be applied to cope with the specific loads of the planet wheels.

Due to the friction coefficient of the traction wheels, the ratio of the radial to the axial forces cannot exceed a certain limit. Embodiments of the present invention take advantage of this property providing a compact bearing construction in the planets, where one single tapered bearing (14) takes both the axial (27) and part of the radial load (26).

In operation, the transmission or the planetary variator always is loaded by axial forces (27). The remaining part of the radial load is taken by an additional radial bearing (15) as shown in FIG. 2.

Figure 8A:
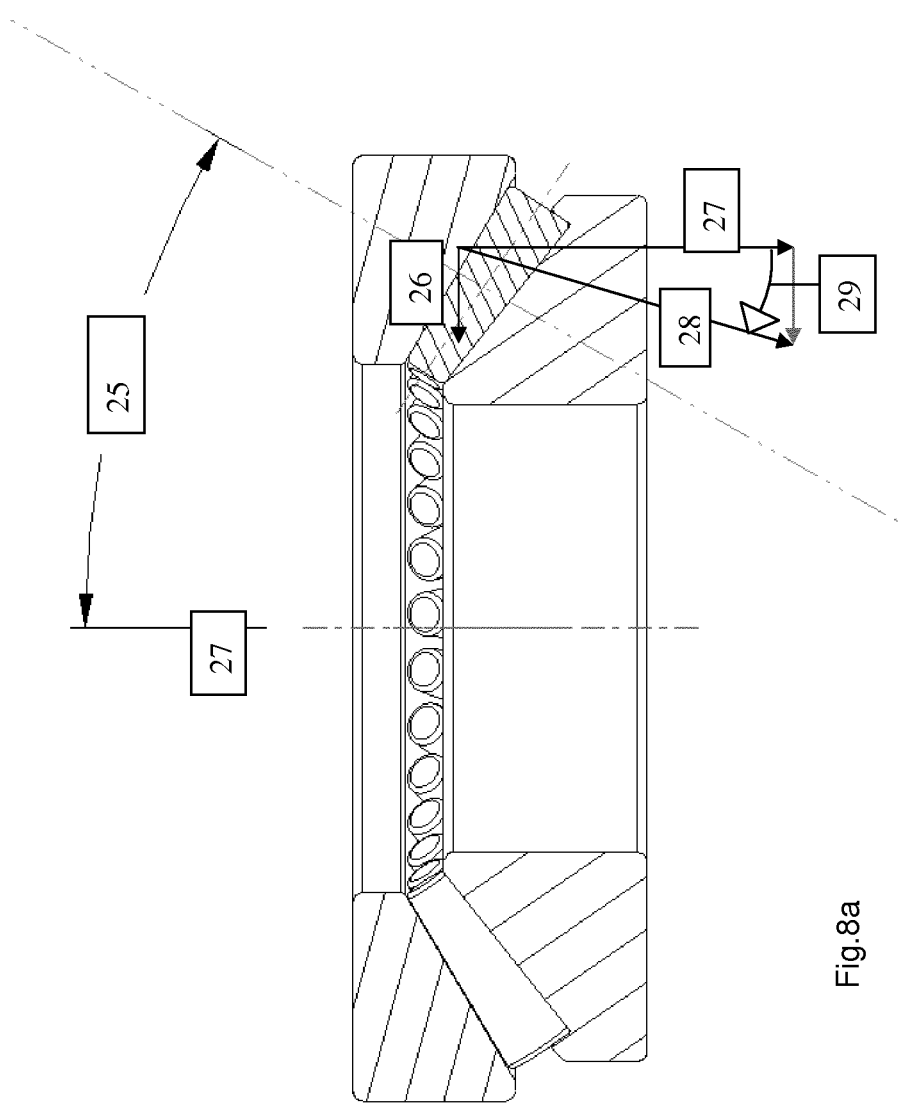
FIG. 8: Schematic representation of the inclination angle of the tapered bearing.

The inclination angle of the outer ring of the tapered bearing (14) is typically made so that it supports more effectively the resultant force. FIGS. 8a and b show schematically the resultant (28) of the axial and radial forces acting on the outer ring of the bearing. The normal on the rolling surface of the bearing outer ring is represented by the dot and dash line.

Figure 8B:
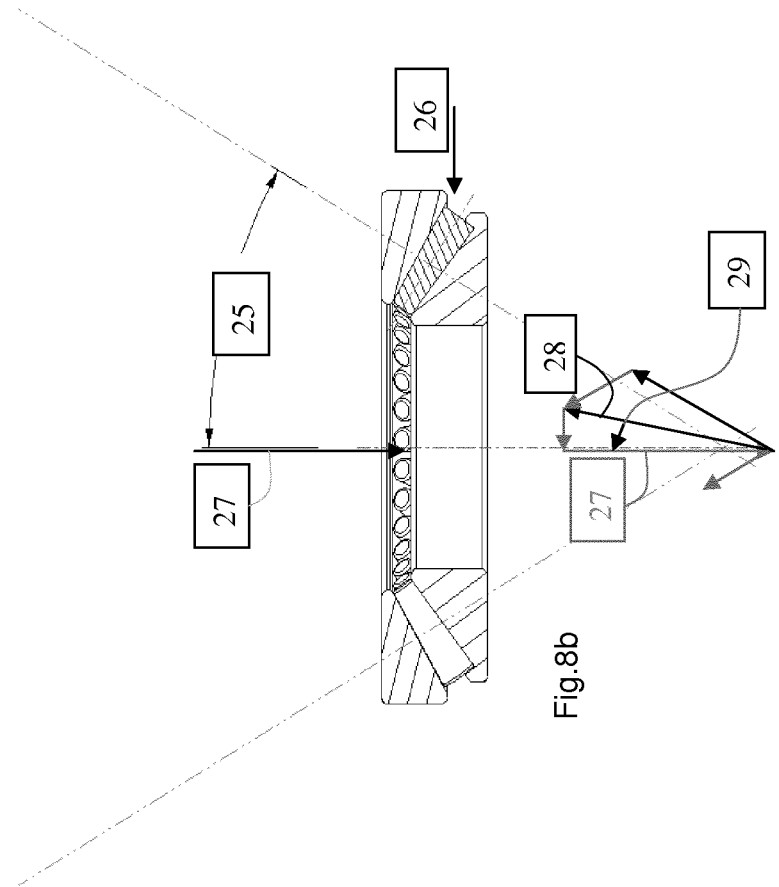

The inclination angle of the normal versus the axial load (27), represented by (25) in FIG. 8 is chosen much smaller than in a standard bearing but this angle must stay larger than the angle of the resultant (28) versus the axial load (27), represented by angle (29) in FIG. 8. Depending on the design and the friction coefficient, the angle of the resultant (28) versus the axial load (27), represented by angle (29) never exceeds 10° to 25°. The inclination angle of the normal versus the axial load of a standard tapered bearing is typically larger than 60°, but for the present application inclination angles of the normal versus the axial load (27), represented by (25), can be chosen between 20° and 50°. This way the bearing size can be reduced and the tapered bearing remains stable.

Axial spherical roller bearings have a similar geometry as the tapered roller bearing with a small inclination angle and they are sold as a standard part. They can replace the tapered bearing.

Embodiments of the present invention comprising a bearing configuration as described above, provided with the tapered bearing (14) and a radial bearing (15), lead to a more compact and less expensive bearing design compared to the bearing design of patent application PCT/EP2008/057009. The requirements for accuracy and hardness of the components are less severe because the needles or rollers do not run directly against the components anymore.

7. Legs of the Planet Fork

In many transmission applications most of the driving occurs in forward. Hence, the life of the material of the planet fork is largely determined by the stresses during forward driving. At all ratios in forward, the bending moments in the planet fork appear in the same sense. As a result, one leg of the planet fork will be subject to much more load than the other leg of the planet fork.

In the design of the planetary variator it is necessary to avoid either interference amongst the planet forks, either interference between planet fork and ring wheel and sun wheel. A planet fork with symmetrical legs as described for the planetary variator design in the patent application PCT/EP2008/057009 does not use the available space efficiently so that the strength of the forks is not optimized within the space limitations. By introducing a novel asymmetric design comprising two unequal legs, as described further below, the planetary variator is able to transmit more torque within the mentioned application conditions.

Figure 3:
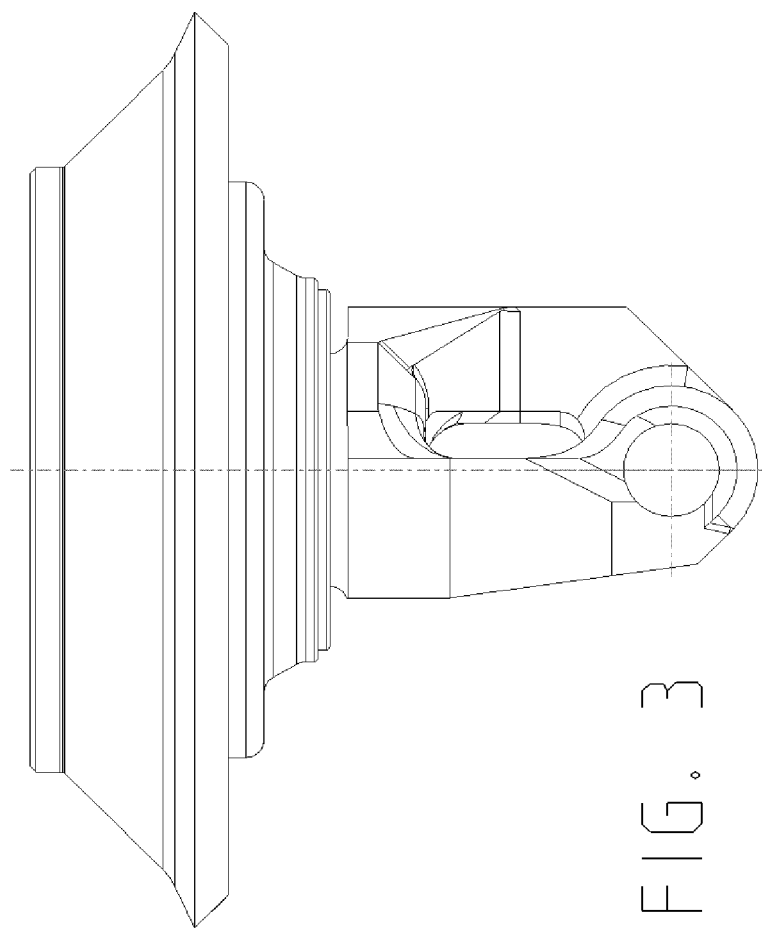
FIG. 3: Schematic representation of the asymmetric planet fork with unequal legs.

As illustrated in FIG. 3, embodiments of the present invention show a robust and compact design of the planet fork (11) by adjusting the leg with highest load to a slightly thicker component while the leg with lowest load is redesigned to a slightly thinner component. The symmetry in the planet fork (11) is no longer preserved. The transmittable torque thereby increases while the overall dimensions remain the same.

FIELDS OF APPLICATION

This transmission is conceived for passenger cars, but its application can be extended to:
  Trucks: where many ratios, deep and high ones, together with a high efficiency are needed. Garbage trucks would no longer wear their clutch and drive much more efficiently.

City buses will drive much more efficiently because of the frequent starts without slipping clutches or slipping torque converter. On top there is no need to speed up the engine for launching the bus because the engine torque is extremely low due the unlimited torque multiplication at low speed.

Off-highway
- applications where creeper speed and a good efficiency at low speed is important such as large grass mowing machines
- lift trucks which need a smooth low speed manoeuvring ability in both driving senses and a relatively fast reverse (comparable to the $2^{nd}$ gear in forward)
- machines like telescopic boom handlers where a low speed must be controllable independent from the varying resistance of the ground Kinetic Energy Recovery Systems (known as KERS) can transmit power between the flywheel and the engine without any slipping component. At the same time the vehicle is driven also by an RVT.

Wind turbines where the transmission "output" is connected to the very slowly rotating propeller and the "input" is driving the generator.

Other industrial applications where power must be transferred at variable speeds.

What is claimed is:

1. A planetary variator, functioning as a subsystem for a variable or reversible transmission comprising
   a ring wheel,
   two or more planets mounted around a central shaft, and
   a sun wheel, such that the ring wheel, the central shaft and the sun wheel form an interface with other transmission components, wherein each planet comprises
   a planet wheel running on a running surface of said sun or ring wheel, and
   a planet fork connecting the planet to said central shaft, characterized in that
   a continuous or a discontinuous control system is integrated in the assembly of each of the planets to ensure that the tip of a cone formed by the theoretical, non-crowned, planet wheel running surface coincides precisely with a hinge axis of the planet fork
   when a certain load is applied on the running surface, by locking the position of the planets on the central shaft using a screwing system integrated within the planet fork.

2. A variable transmission comprising two planetary variators according to claim 1, namely a primary and a secondary planetary variator.

3. The variable transmission according to claim 2, further comprising
   a housing, a squeezing piston to press all traction wheels against each other, and a steering piston to control the ratio, a transmission controller and a final slip protection, characterized in that:
   a) the steering piston does not rotate together with said main shaft, but moves axially with respect to said housing and it relocates said main shaft axially over an axial bearing, and in that the hydraulic or pneumatic pressure for said steering piston is directly supplied or drained from said housing without any dynamic seals; and
   b) the transmission controller calculates a squeezing pressure acting on the squeezing piston based on an input or output torque signal, an input speed, a speed ratio and a speed of ratio variation, where the input torque signal is the highest of the following 1 or 2 input data:
      b1) input torque signal from engine model, including an auxiliaries, or from a model describing the output torque, or
      b2) torque signal from an output torque sensing device.

4. The variable transmission according to claim 3, wherein in option b) the squeezing pressure is further adjusted by keeping the microslip at a predefined value by a proportional integral derivative controller and wherein said microslip itself is calculated by comparing the following 2 signals:
   b3) the theoretical no load speed ratio obtained from measuring the position of the steering piston, or the no load speed ratio calculated from measuring the squeezing piston position and the knowledge of the requested driving sense, and
   b4) the measured actual speed ratio.

5. The variable transmission according to claim 2, further comprising a final slip protection in case the torque exceeds the transmission torque capacity, by putting immediately the squeezing pressure and the engine torque to zero as long as the overload is applied, and whereby the overload torque is detected when the required squeezing pressure would exceed the design limit.

6. A method of using the variable transmission according to claim 2, in passenger cars, trucks, garbage trucks, city buses, off-highway vehicles, mowing machines, lift trucks, telescopic boom handlers, Kinetic Energy Recovery Systems (KERS), wind turbines, or industrial applications where power must be transferred at variable speeds.

7. The planetary variator according to claim 1, wherein said planet wheel is made of an upper planet mantle and a lower planet mantle, such that said neutral fiber of the upper planet mantle principally coincides with the vector of the normal forces on said planet wheel running surface, and such that the neutral fiber of said lower planet mantle lies principally in the plane formed by the tangential forces acting on the two contact areas of said running surface.

8. The variable transmission according to claim 2, wherein the axial and a part of the radial forces acting on each of said planets are taken by one tapered bearing or one spherical roller bearing, wherein the remainder of the radial forces is supported by one radial bearing.

9. The variable transmission according to claim 8, wherein said axial bearing is a tapered roller bearing or a spherical roller bearing comprising a number of rolling elements, an inner ring and an outer ring, said outer ring have a rolling surface in contact with said rolling elements, said rolling surface being inclined relative to the rotational axis of said outer ring, the inclination angle of the bearing outer ring rolling surface of said spherical roller bearing being defined at the middle of the contact length with said rolling elements, said inclination angle of the outer ring rolling surface relative to said bearing outer ring axis ranging from 20° to 50°.

* * * * *